United States Patent
Zemel et al.

(10) Patent No.: US 11,383,267 B2
(45) Date of Patent: *Jul. 12, 2022

(54) SYSTEMS AND METHODS OF UV PRINTING ON SUBSTRATES

(71) Applicant: Mr. Bar-B-Q Products LLC, Melville, NY (US)

(72) Inventors: Marc Zemel, Melville, NY (US); Joanne Rudis, Melville, NY (US)

(73) Assignee: Mr. Bar-B-Q Products LLC, Hauppauge, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/155,930

(22) Filed: Jan. 22, 2021

(65) Prior Publication Data
US 2021/0138505 A1 May 13, 2021

Related U.S. Application Data

(63) Continuation of application No. 16/690,458, filed on Nov. 21, 2019, now Pat. No. 10,913,092.

(60) Provisional application No. 62/770,241, filed on Nov. 21, 2018.

(51) Int. Cl.
| C09D 11/101 | (2014.01) |
| B05D 3/06 | (2006.01) |
| B05B 16/00 | (2018.01) |
| B05B 13/04 | (2006.01) |
| B05D 3/02 | (2006.01) |
| B29L 31/44 | (2006.01) |

(52) U.S. Cl.
CPC .......... *B05D 3/067* (2013.01); *B05B 13/0431* (2013.01); *B05B 16/95* (2018.02); *B05D 3/0254* (2013.01); *C09D 11/101* (2013.01); *B29L 2031/44* (2013.01)

(58) Field of Classification Search
None
See application file for complete search history.

(56) References Cited

U.S. PATENT DOCUMENTS

| 5,334,999 | A | 8/1994 | Kashiwazaki et al. |
| 7,438,407 | B2 | 10/2008 | Coghlan et al. |
| 9,573,343 | B2 | 2/2017 | Pervan |
| 9,580,362 | B2 | 2/2017 | Sheng et al. |
| 9,931,667 | B2 | 4/2018 | Kalwa |
| 10,063,747 | B2 | 8/2018 | Kalwa et al. |
| 2004/0004643 | A1 | 1/2004 | Satomura |
| 2007/0097197 | A1 | 5/2007 | Kremers |
| 2009/0178751 | A1* | 7/2009 | Presley ............. H01L 21/67225 156/60 |
| 2009/0301027 | A1* | 12/2009 | Pelletier ................. C04B 41/52 52/741.4 |
| 2014/0196618 | A1* | 7/2014 | Pervan .................. B05D 3/065 101/32 |

(Continued)

*Primary Examiner* — Erica S Lin
(74) *Attorney, Agent, or Firm* — Carter, DeLuca & Farrell LLP

(57) ABSTRACT

A system and method for printing patterns on a substrate, including a substrate; a powder; a sealing coating; and a UV curable paint; wherein the powder, the sealing coating and the UV curable paint are deposited onto the substrate and heated and cured. The method is designed to make the substrate have a faux appearance with lower costs than manufacturing the real substrate it was meant to look like.

27 Claims, 15 Drawing Sheets

(56) References Cited

U.S. PATENT DOCUMENTS

2020/0048467 A1* 2/2020 Yamashita ............ C08L 101/08

* cited by examiner

SYSTEMS AND METHODS OF UV PRINTING ON SUBSTRATES

CROSS-REFERENCE TO RELATED APPLICATIONS

The present application is a continuation of U.S. patent application Ser. No. 16/690,458, filed on Nov. 21, 2019, which claims the benefit of and priority to U.S. Provisional Patent Application Ser. No. 62/770,241, filed on Nov. 21, 2018, the entire contents of each of which are incorporated by reference herein.

FIELD OF THE TECHNOLOGY

The present device, system, and methods is related to the field of printing on substrates utilizing ultraviolet (UV) light or radiation, and in particular to, the printing of patterns on substrates that can be used in connection with grill surfaces, fire pits and mantels, and other furniture.

BACKGROUND

UV-curing printing inks have been known in the art for some time. Though, it is only recently that UV-printing inks which from some aspects are adequate for industrial use have been developed, especially when referring to lowering the cost of production of household items such as tables, heaters, grills, and the like. In addition, in the last few years, UV-curing has become more useful due to advances in the technology of UV lamps and curable materials. Application of UV-curing coatings can now be processed with sheetfed, web and wide-format inkjet equipment. Even so, although UV-printing systems and methods are disclosed, less costly, more efficient systems and methods are needed which can be used on other substrates not before contemplated.

SUMMARY

Example aspects described herein relate generally to the printing or depositing of patterns and such and, more particularly, to UV printing systems, and more specifically to deposition of a liquid or solid coating, or a mixture thereof which is curable by UV light.

Accordingly, this disclosure details implementations for a UV light system for depositing a design or pattern on a substrate.

In one aspect, the present disclosure provides a method for printing or depositing a faux design on a workpiece by providing a workpiece defining at least one surface, coating the at least one surface of the workpiece with a substantially transparent achromatic color coating or a color that fully reflects and scatters all the visible wavelengths of light, exposing the workpiece to a heat source at a predetermined temperature for a predetermined time, providing a robotic device configured for printing or depositing a design onto the at least one surface, the robotic device including a computing device, a printing head, a table, a memory, a processor, and at least one UV curable substance, disposing the workpiece about the table of the robotic device, configuring the robotic device according to the workpiece, selecting a design from a listing of predetermined designs configured according to the workpiece, processing the design with the processor and the computing device, instructing the robotic device to deposit the at least one UV curable substance according to the design onto the at least one surface while exposing the design to a UV light for a predetermined time, depositing the at least one UV curable substance according to the design onto the at least one surface, applying at least one layer of a substrate sealant to the at least one surface and the at least one UV curable substance, optionally applying at least one layer of a second UV curable substance onto the at least one surface, applying heat to the at least one surface and the second UV curable substance for a predetermined amount of time at a predetermined temperature, and exposing the workpiece to UV radiation emitted from a UV source for a predetermined amount of time at a predetermined temperature, such that the design is permanently affixed to the workpiece to provide a faux design.

In another aspect, the present disclosure provides a method of printing patterns on a substrate including providing a well buffed and clean workpiece or mantel, coating the mantel with a white colored powder and curing the powder coating by exposing the mantel to heat at about 220 degrees C. for about 30 min, placing the mantel at a designated location above a working table of a printer connected to a computing device, adjusting the height of a printing head of the printer manually according to the mantel's height and setting a starting point, selecting a design from a listing of predetermined designs stored in a memory of the computing device, processing the selected design via a processor of the computing device, communicating the selected design to the printer, providing a light source configured to provide light to the mantel where the light source is coupled to the printer and the printer includes a UV curable ink, instructing the printer to deposit the selected design onto the at least one surface, activating a UV lamp until the printer reaches a normal working power and moving the printing head to a starting point of the mantel; depositing the selected design onto the mantel and displaying the advancement of the deposition of the design onto the mantel on a display of the computing device, spraying the mantel with a substrate paint allowing the substrate paint to dry for a predetermined time, spraying a UV paint onto the mantel, exposing the mantel to an oven set at a predetermined temperature for a predetermined time for volatilizing a diluent within the UV paint, and exposing the mantel to a UV curing zone having a UV light configured to irradiate UV light to the mantel, such that the selected design is permanently affixed to the mantel providing a faux appearance.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

The accompanying drawings, which are incorporated in and constitute a part of this specification, illustrate embodiments of the disclosure and, together with a general description of the disclosure given above and the detailed description is given below, serve to explain the principles of the disclosure, wherein.

DETAILED DESCRIPTION

In reference to FIGS. 1-16, the present disclosure relates to printing, additive manufacturing, and deposition of a design (such as a faux design) onto a workpiece. The design is associated with UV curable coatings (which may include UV curable substances) and patterns, such as camouflage patterns, symbols and shapes patterns, a wood finish pattern, a stone or rock look pattern, and line patterns, ceramic tile patterns, concrete patterns, and all other patterns that can be designated by computer which are cured or dried onto a workpiece or a portion thereof under the action of UV radiation. Specifically, the present disclosure relates to depositing a UV coating or a coating including a UV curable element according to a predetermined design onto a workpiece 100 such that the workpiece can have an aesthetically attractive, faux look.

Figure 1:
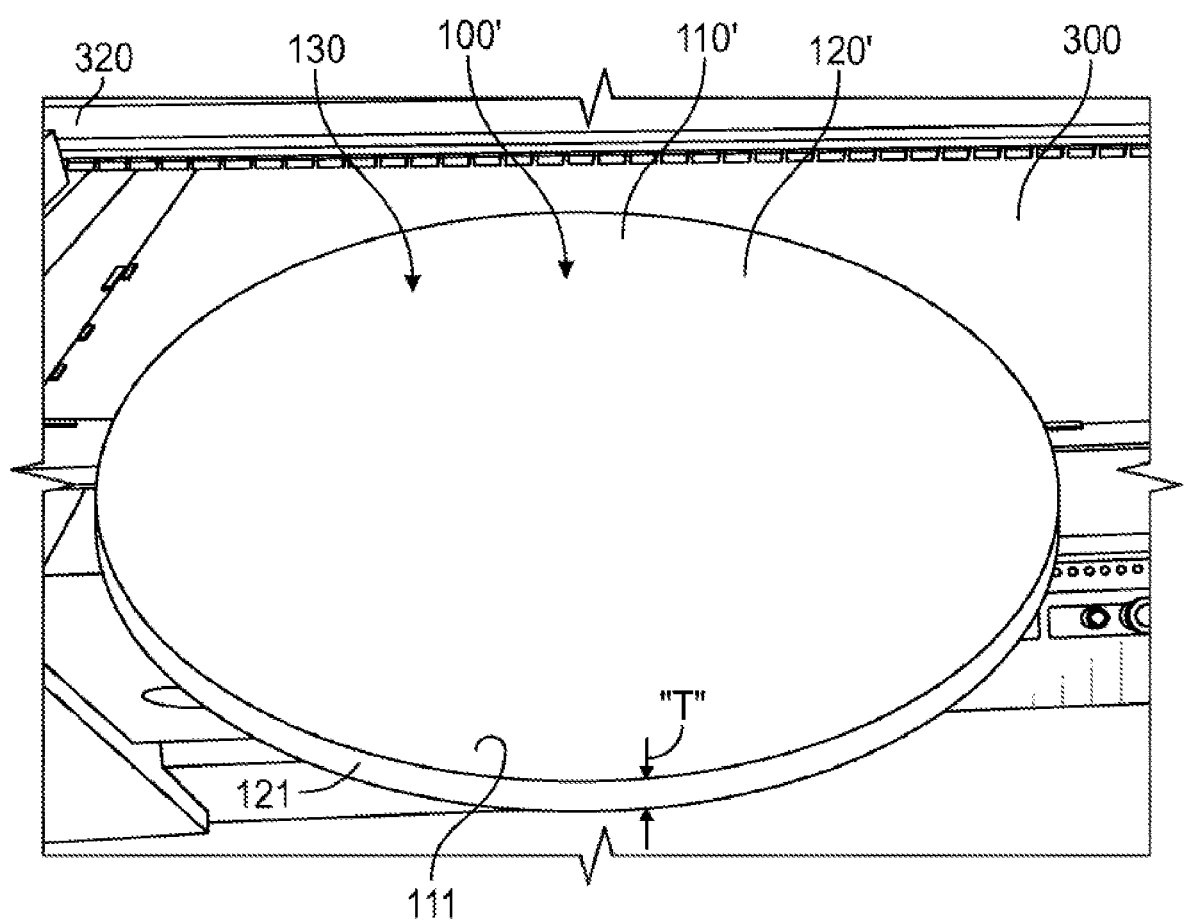
FIG. 1. is a perspective top view of a workpiece in accordance with this disclosure prior to depositing a design thereon.
Figure 2:
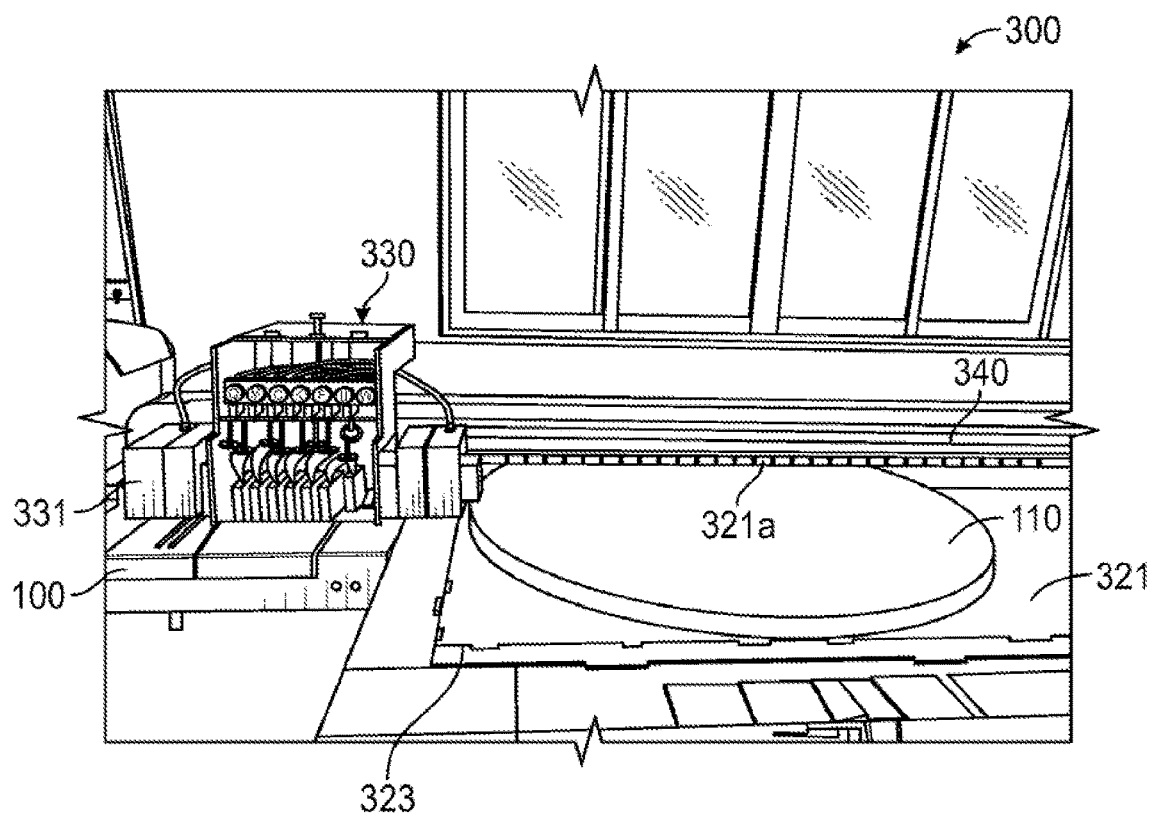
FIG. 2 is a perspective left side view of the workpiece shown in FIG. 1 disposed about a robotic device at a selected position in accordance with this disclosure.
Figure 3:
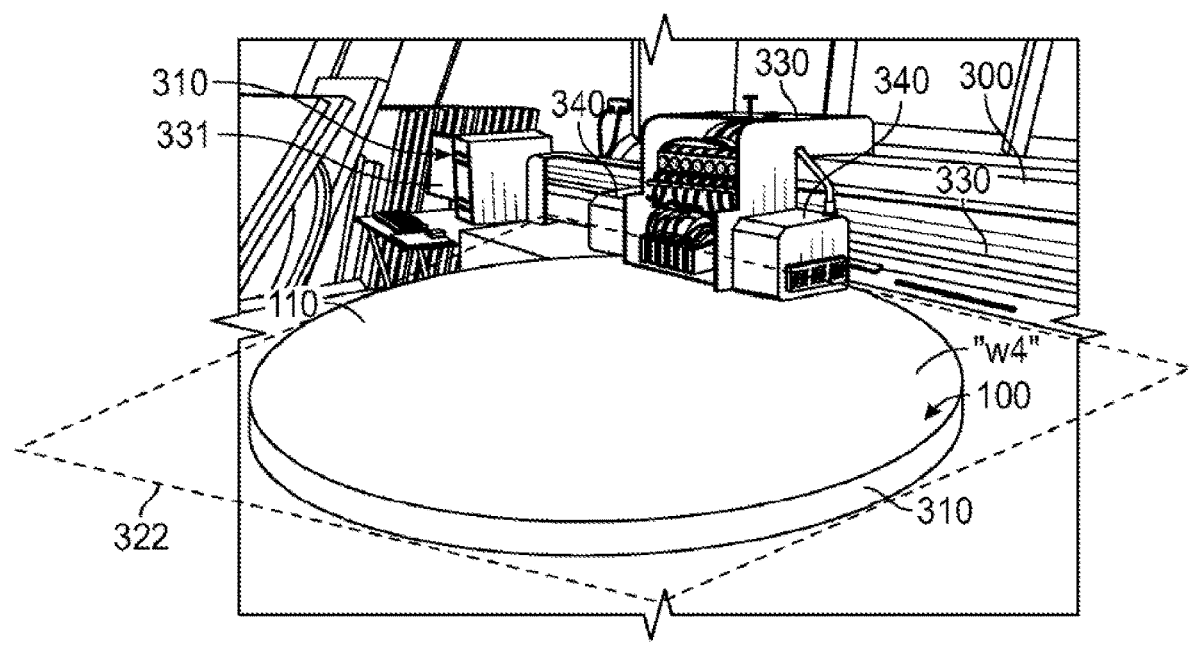
FIG. 3 is a perspective right side view of the workpiece shown in FIG. 1 after the height of a robotic device in accordance with this disclosure was adjusted according to the workpiece.

With reference to FIGS. 1-3, a workpiece 100 is presented including at least one surface 110, and defining a body 120. In embodiments, the workpiece 100 may be a workpiece (or a portion thereof) selected from a table, floor vinyl, floor tile, fire pit, house decoration insert, mantel, or the like. The workpiece 100 may be configured using materials such as resin, metal, glass, and ceramic and alloys, and after disposing a design replicating the look or appearance of materials like wood, marble, grouted tile patterns, concrete, quartz, and granite. Moreover, the workpiece 100 may be manufactured via well-known manufacturing methods such as additive manufacturing, molding, machining, or the like. In embodiments, the workpiece 100 is configured as a mantel made out of wood or metal and the body 120 of the workpiece 100 is configured into a cylindrical shape (as shown in exemplary embodiments depicted in FIGS. 1-14). In other words, the body 120 is configured similarly to a disk including a body perimeter 121 configured to wrap around the body 120 which is configured to receive a UV coating. In alternative embodiments, the workpiece 100 may be any other shape required for the finished product, including square, rectangle, oval, triangle, etc.

Prior to receiving a UV curable coating 200, the at least one surface 110 may be buffed and/or coated with an initial coating including a substantially transparent achromatic color or a color that fully reflects and scatters all the visible wavelengths of light. For example, the at least one surface 110 can include at least one layer of a coating 130 of a white coating 111, as shown in FIG. 1. The application of the at least one layer of coating 130 onto the workpiece 100 may be via spraying, spreading, brushing or other suitable methods. In embodiments, more than at least one layer of coating 130 may be required. For a workpiece 100 manufactured via molding, the coating 130 may be applied to a mold (not shown) before or during the forming of the molded workpiece 100. For example, if the molded workpiece 100 is made out of a resin (not shown) configured to take the shape of the mold (not shown), the coating 130 maybe applied to the mold (not shown) prior to filling the mold with the resin material. Specifically, a surface (not shown) of the mold (not shown) configured to engage the resin (not shown) is configured to receive the coating 130. It is understood that selected workpieces 100 may not need a coating 130 before receiving the UV curable coating 200. For a workpiece 100 including the coating 130, after the coating 130 is disposed on the workpiece 100 the coating 130 along with workpiece 100 may be exposed to heat to enhance or enable adhesion of the coating 130 onto the workpiece 100. For example, the coating 130 and the workpieces 100 may be inserted in an oven set at a predetermined temperature, from about e.g. 200 to about 250 degrees Celsius, for a predetermined period of time, from about 20 to about 50 minutes). In selected embodiments, the coating 130 may be applied in layers of from approximately 0.001 to approximately 0.1 inches in thickness. In examples, the coating 130 may be commercially available (from Fujian Wanan) and may include components such as an epoxy ethyl methyl, a thermoplastic such as low density polyethylene (LDPE), mercapatobenzothiazole zinc salts, and the like in selected ratios, for example, but not limited to the following ratios:

| Components | CSA# | Content |
| --- | --- | --- |
| Epoxy ethyl methyl | 2451-62-9 | ≥5-<6 |
| LDPE | 9002-88-4 | ≥1.2-<2.9 |
| Mercaptobenzothiazole zinc slat | 155-04-4 | ≥0.1-<0.18 |

Figure 4:
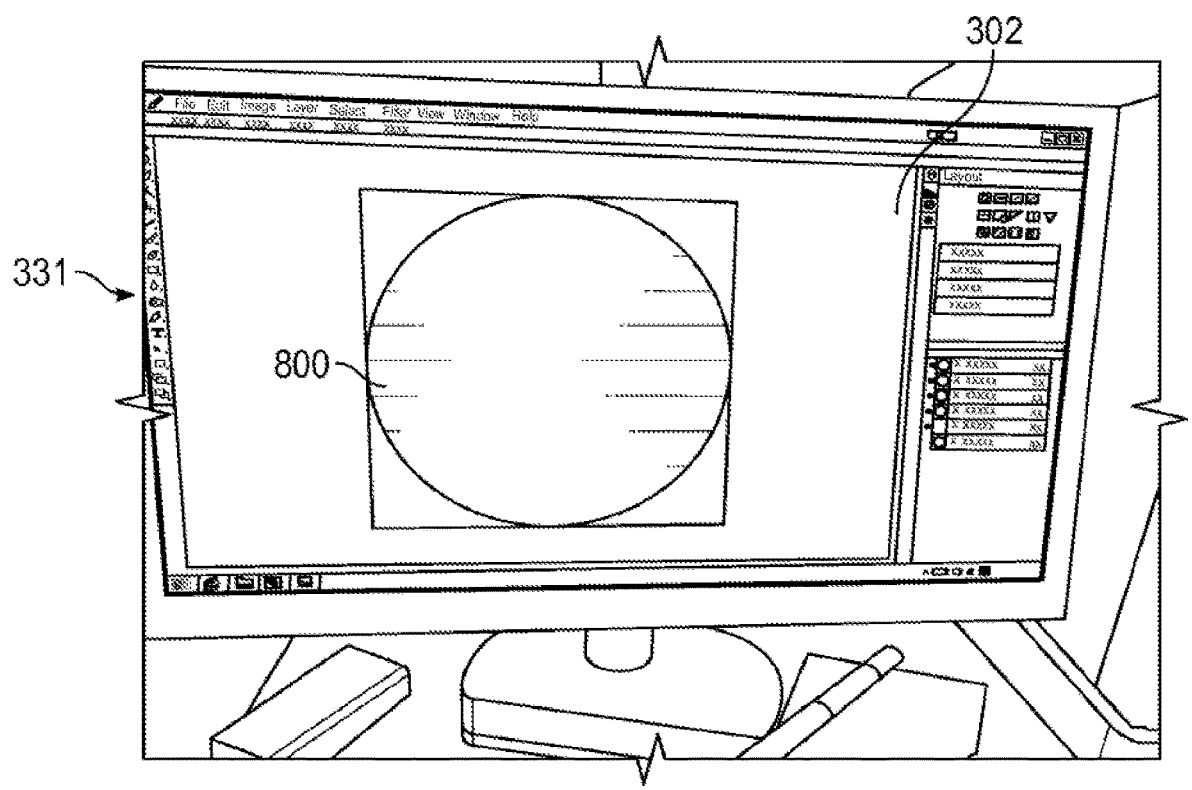
FIG. 4 is a front view of a display of the robotic device showing the design while being configured for printing onto the workpiece shown in FIG. 1.
Figure 5:
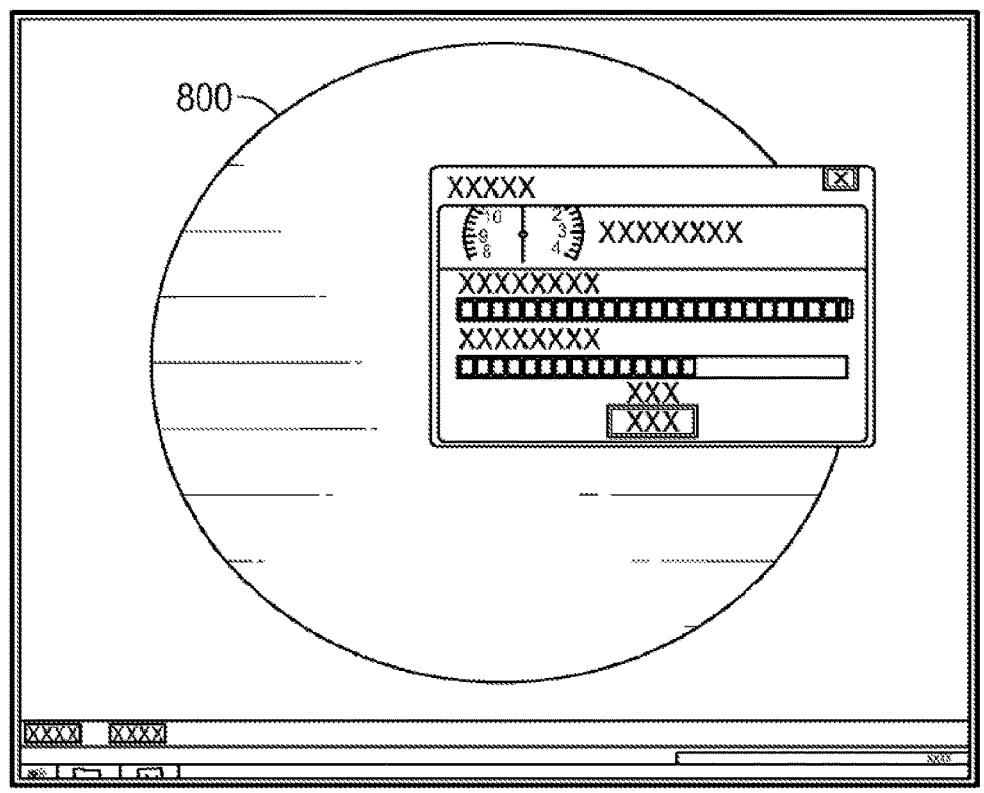
FIG. 5 is a front view of a portion of the display of the robotic device displaying the design during processing thereof and prior to depositing of the design onto the workpiece of FIG. 1.

With reference to FIGS. 4 and 5, after the application of the coating 130, a UV curable coating 200 is deposited onto the workpiece 100 above the at least one layer of coating 130 according to design 800. The design 800 is described in further detail hereinbelow. FIG. 4 shows a display illustrating a computer program (below noted as computer program 302) exhibiting a schematic image of the workpiece 100 with the UV curable coating 200 deposited onto the at least one layer of coated surface prior to depositing the UV curable coating 200 onto the workpiece 100. FIG. 5 shows the processing of the schematic image associated with the workpiece 100 and the UV curable coating 200 depositing of the UV curable coating 200 onto the workpiece 100. The UV curable coating 200 may be selected from a UV curable paint or a UV curable inks, a surface sealant, an adhesive, a strainer, a polymer, an acrylate, a paint, a pigment, or other suitable coating. In embodiments, the at least one surface 110 may be further configured to receive other non-UV curable coatings or a combination of the UV curable coating 200 and a non-UV curable coating. In embodiments, the UV curable coating 200 may be an Inkjet ink including coatings listed in the table hereinbelow:

| Components | CAS# | Weight % |
| --- | --- | --- |
| pigment | Proprietary | 1.0-6.0% |
| polyester Acrylate | Proprietary | 5.0-20.0% |
| DPGDA | 57472-68-1 | 10.0-30.0% |
| Acrylate Monomers | Proprietary | 10.0-30.0% |
| Photo-polymerization initiators | Proprietary | 1.0-15.0% |
| surfactant | \ | 0.5-2.0% |

In selected embodiments, the UV curable coating 200 may be an Inkjet ink including the following physical and chemical properties:

| | |
| --- | --- |
| BOILING POINT | N.A |
| SPECIFIC GRAVITY ($H_2O$ = 1) | >1 |
| RELATIVE VAPOR DENSITY (Air = 1) | >1 |
| RELATIVE EVAPORATION RATE (BUTYL ACETATE = 1) | >1 |
| PHYSICAL STATE | Liquid |
| ODOR | Mild |
| SOLUBILITY IN WATER | Insoluble |

Turning now to FIGS. 6-9, the UV curable coating 200 can be deposited onto the workpiece 100 via electrical or a non-electrical device. The non-electrical device may be selected from a pen, a pencil, a brush, a chisel, or a user's hand. The electrical devices may be selected from hand-held devices or non-hand-held devices. The hand-held are devices generally powered by electricity (or systems storing energy) and are configured to fit in a human hand, for example, a rotary tool, perforating or punching tools, toner/ink disposing apparatus (such as tattoo-machines, or hand-held printers), a 3D-pen, or the like. The non-hand-held devices are powered by electricity and are generally more complex devices such as robotic devices, for example, 3D printers, CNC mills, CNC printers or the like. As seen in FIGS. 6-9 (or FIGS. 2 and 3), a robotic device 300 may be configured to deposit the UV curable coating 200 onto the workpiece 100. The robotic device 300 includes a computing device 310, a bed 320, a printing head 330, a moving rail 340, at least one memory (not shown), and at least one processor (not shown). The bed 320 includes a working space 321, a plane 322 (FIG. 3), and a coordinate system 323 including directions X, Y and Z, and may be stationary. Alternatively, the bed 320 may be configured to move with reference to the printing head 330 or the computing device 310. In embodiments, the working space 321 includes an initial reference point 321a. The initial reference point 321a or point 321a may be a point disposed adjacent to the working piece 100 or disposed about the coordinate system 323 and above the plane 322. Alternatively, the initial reference point 321a may be a point disposed along the body perimeter 121. As shown in an exemplary embodiment depicted in FIGS. 1 and 2, the initial reference point 321a is disposed adjacent to the at least one surface 110. In selected embodiments, the initial reference point 321a is the central point of the coordinate system 323 and the two may be defined by the use of the computing device 310 relative to the position of the workpiece 100. The computing device 310 is configured to communicate with the printing head 330 and includes a display 331. The computing device 310 of the robotic device 300 is configured to include at least one memory (not shown) and at least one processor (not shown). The printing head 330 is configured to communicate with the computing device 310 and is operably connected to the moving rail 340. Generally the printing head 330 is configured to move along the moving rail 340 (FIGS. 6 and 7) and in selected embodiments it may be configured to move along the Z direction of the coordinate system 323. The moving rail 340 is operably connected to the bed 320 and is configured to move along one direction about the bed 320, in embodiments, along the Y direction of the coordinate system 323. In embodiments, the bed 320 may be further configured to receive more than one workpiece 100.

Figure 6:
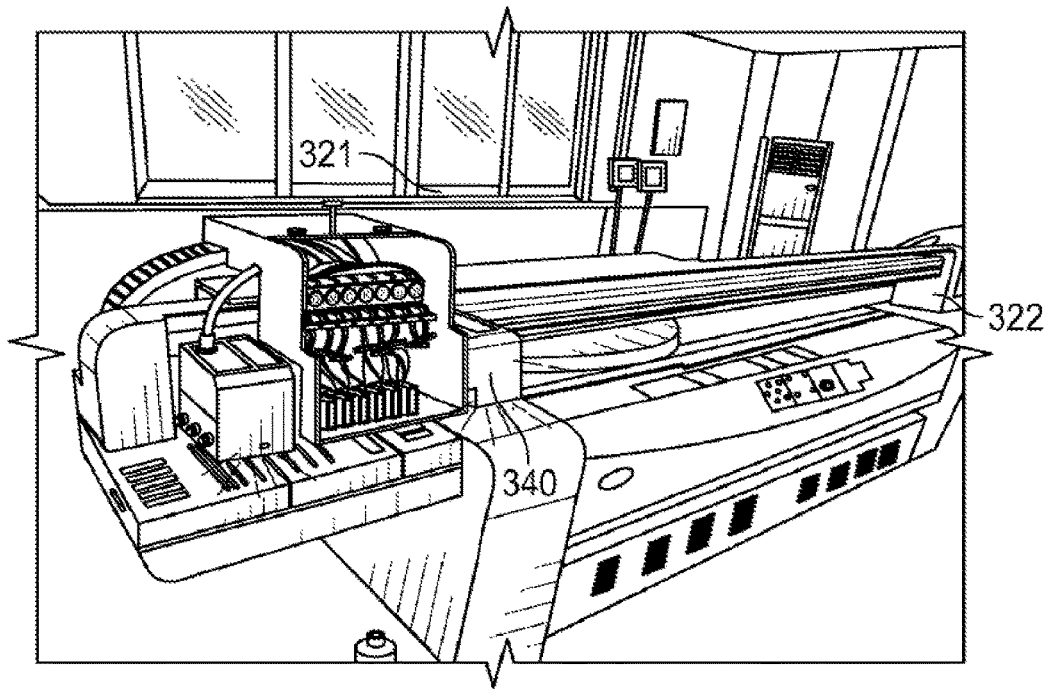
FIG. 6 is a perspective left side view of the workpiece of FIG. 1 depositing within the robotic device and a UV light source emitting a UV light prior to disposing of the design onto the workpiece of FIG. 1.

Specifically, with reference to FIG. 6 (or FIGS. 2 and 3), the printing head 330 is generally configured to deposit the UV curable coating 200 and other types of coating (e.g. ink, paint) onto the workpiece 100 according. For example, the printing head 330 maybe a Seiko printhead configured to carry and deposit a UV curable coating 200 such as UV curable inkjet ink for the Seiko printhead. Moreover, the printing head 330 may be further configured to include at least one cartridge 331 configured to the store the UV curable coating 200. In embodiments, the printing head 330 may be configured to connect to at least one UV light source 330. Alternatively, the UV light source 330 may be coupled to a selected portion of the device 300 instead of the printing head 330.

Figure 7:
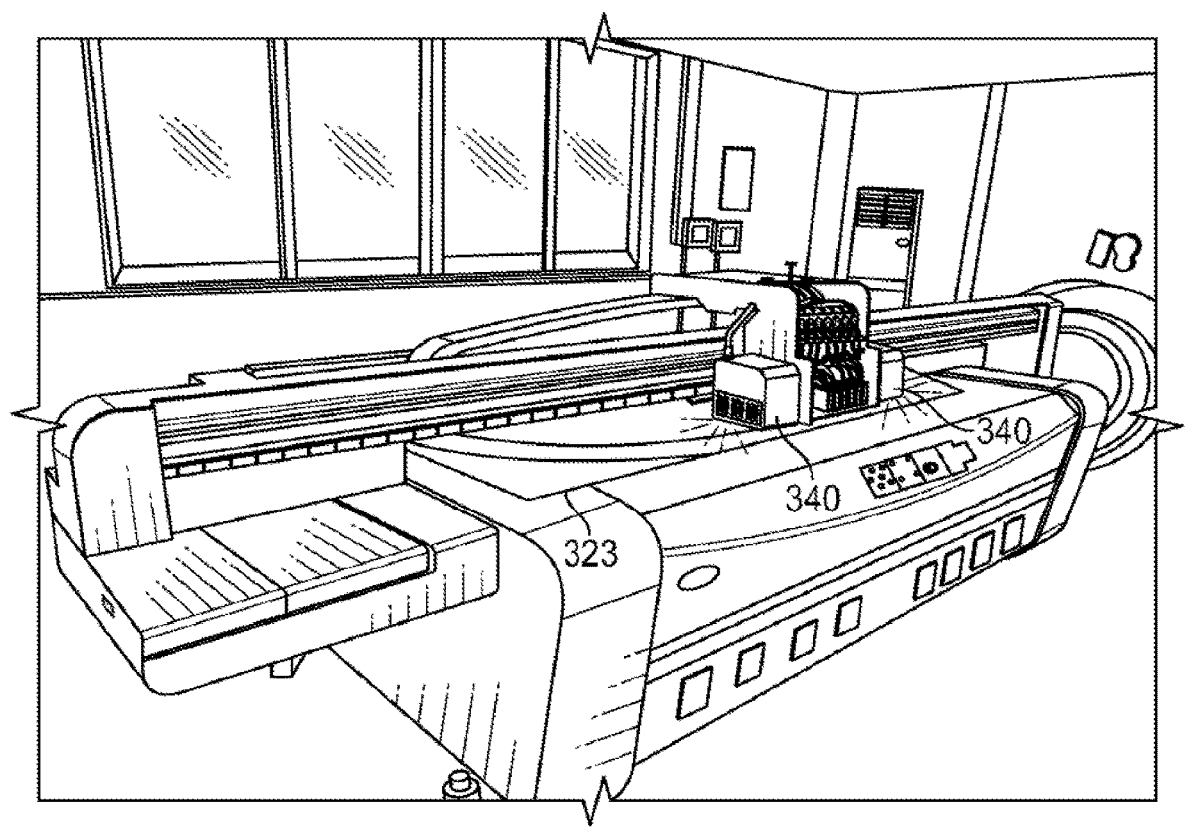
FIG. 7 is a perspective left side view of the workpiece of FIG. 1 disposed within the robotic device and a UV light being emitted during depositing of the design onto the workpiece of FIG. 1.
Figure 8:
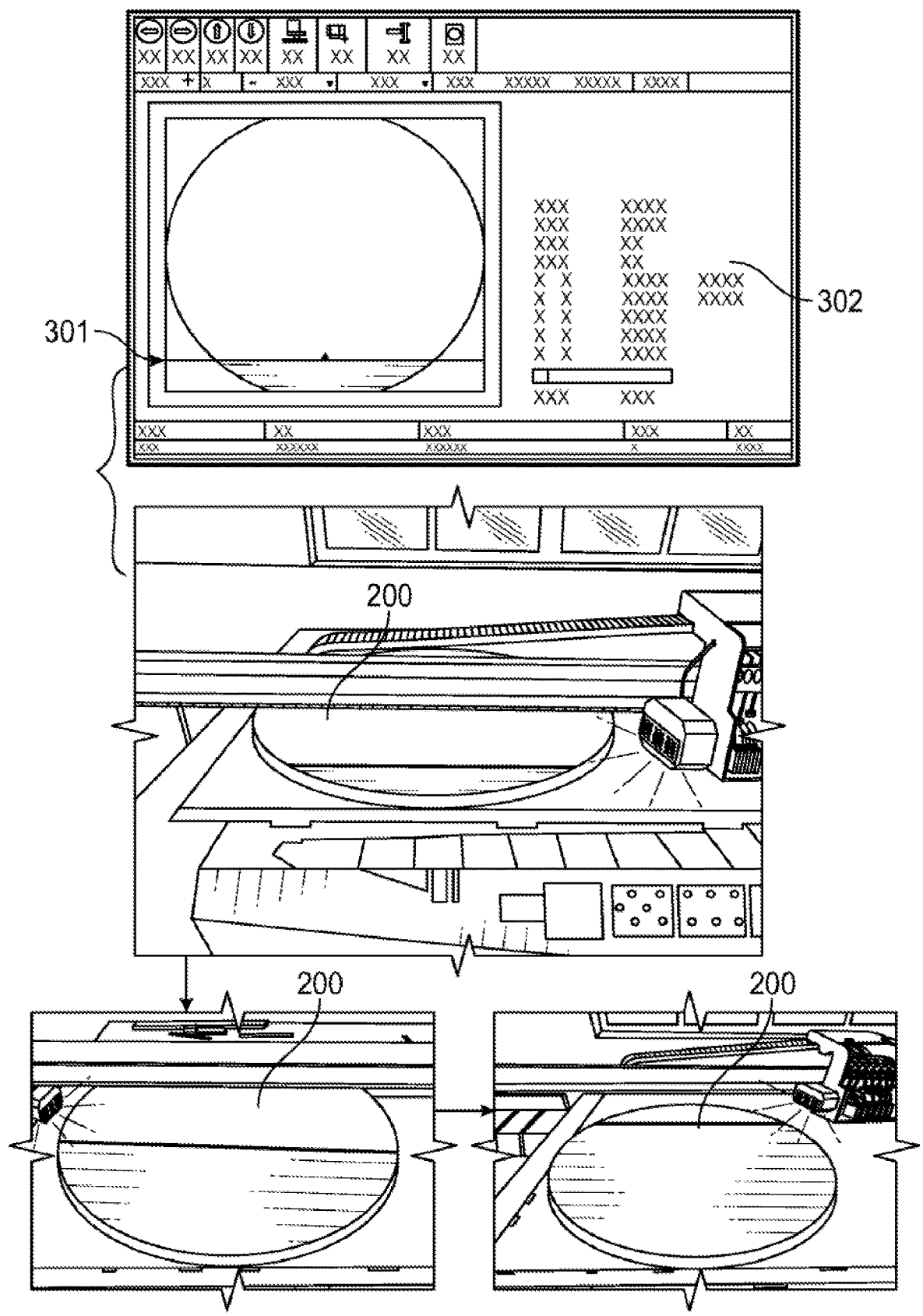
FIG. 8 includes illustrations depicting a sequence showing deposition of the design onto the workpiece of FIG. 1, the sequence including a front view of the display during deposition of the design onto the workpiece of FIG. 1 accompanied by three front side views showing a sequential portion of the deposition of the design onto the workpiece of FIG. 1 starting at the image below to the display, the front view of the display and the image below it thereof are corresponding in time.
Figure 9:
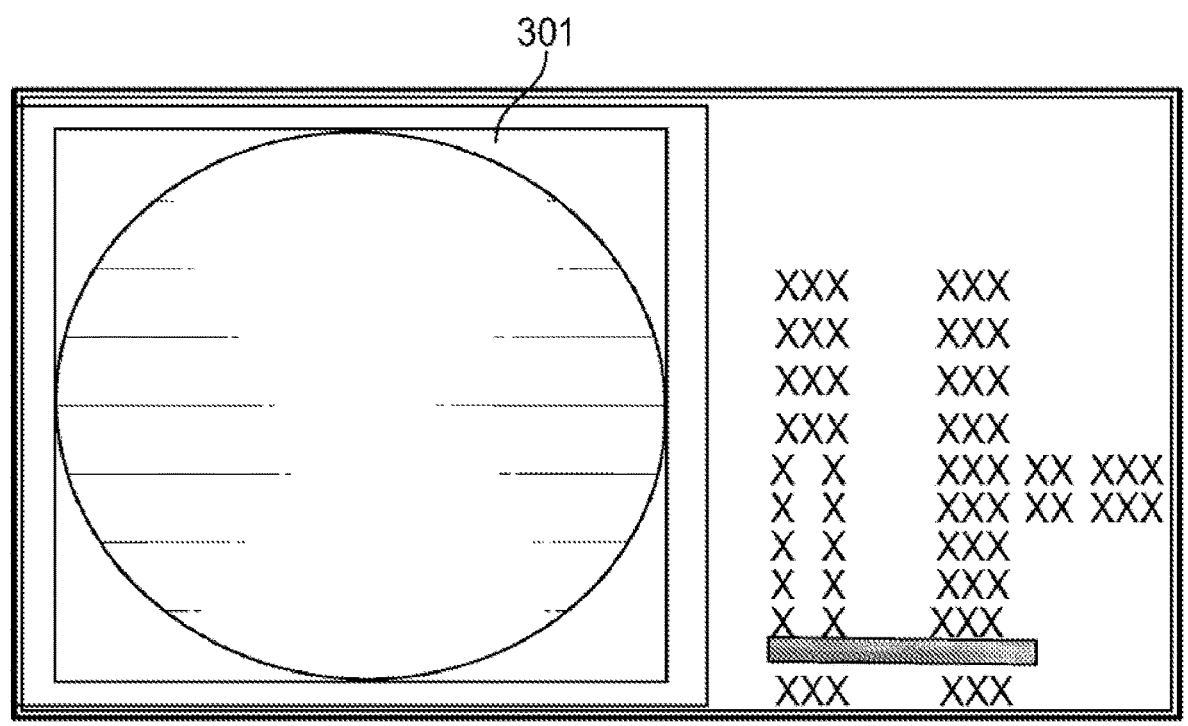
FIG. 9 includes illustrations showing a perspective front side view of the workpiece of FIG. 1 and a front view of the display at a corresponding time after deposition of the design onto the workpiece of FIG. 1.
Figure 9:
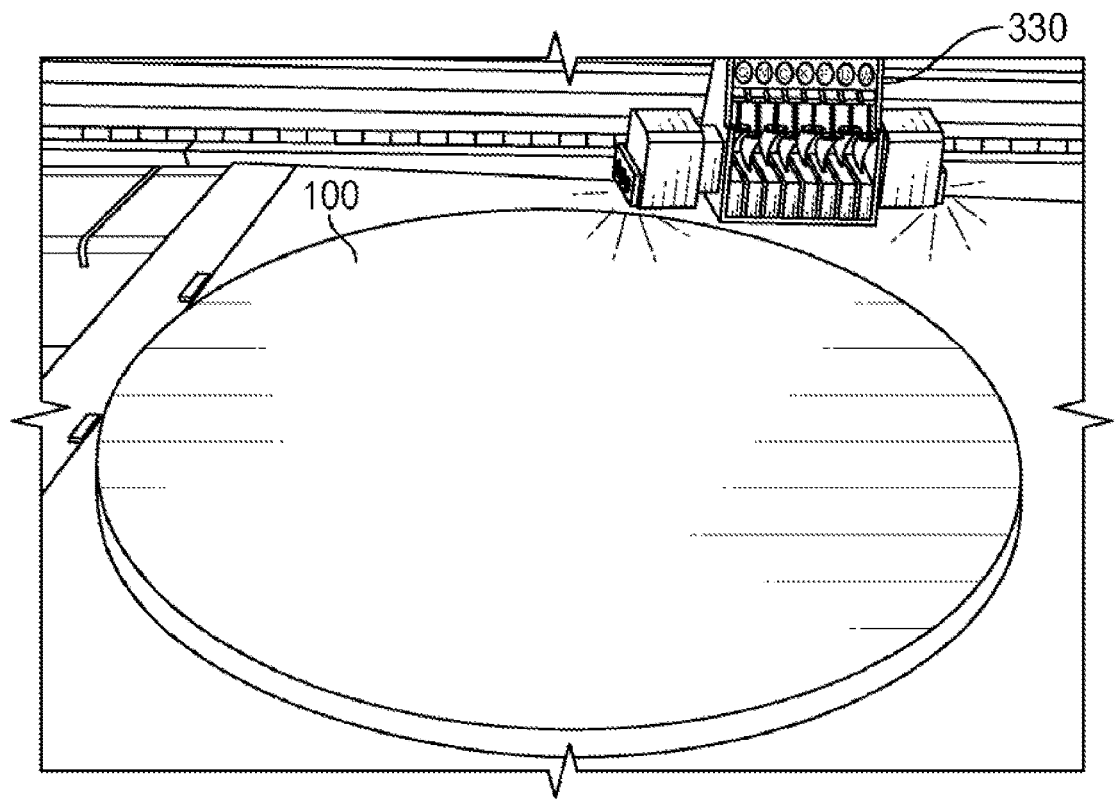

In general, the UV light source 330 is configured to emit a UV light onto the workpiece 100 during deposition of the UV curable coating 200 (FIGS. 7-8). The UV light source 330 may include a UV bulb (not shown) or a UV radiation source with a working power of about 300 watts to about 600 watts (e.g. a medium pressure mercury lamp). In embodiments, the UV light source 330 may be configured to generate a specific wavelength to cure inks or coatings (such as UV coatings), thus, wattage may vary depending on a desired wavelength. The UV lamp 330 may include a configuration of about 140 mm to about 180 mm in size. In embodiments, the UV lamp 330 may be made of quartz and a UV inner gas (not shown) composition may comprise argon. Alternatively, iron and gallium may be added to the UV inner gas composition to achieve a predetermined wavelength. In embodiments, a medium pressure fluorescent arc lamp may be utilized in order to provide ultraviolet radiation. The UV lamp 330 may be in communication with the robotic device 300 or can be manipulated manually. The UV lamp 330 may be configured to emit UV radiation (or UV light) according to a selected process. For example, robotic device 300 may be configured to emit a blinking UV light which may slow down the curing reaction of the coatings deposited onto the working piece 100. In embodiments, the robotic device 300 may be further configured to depose one or more design 800 (or an alternative design (not shown)) onto more that one workpiece 100.

Figure 10:
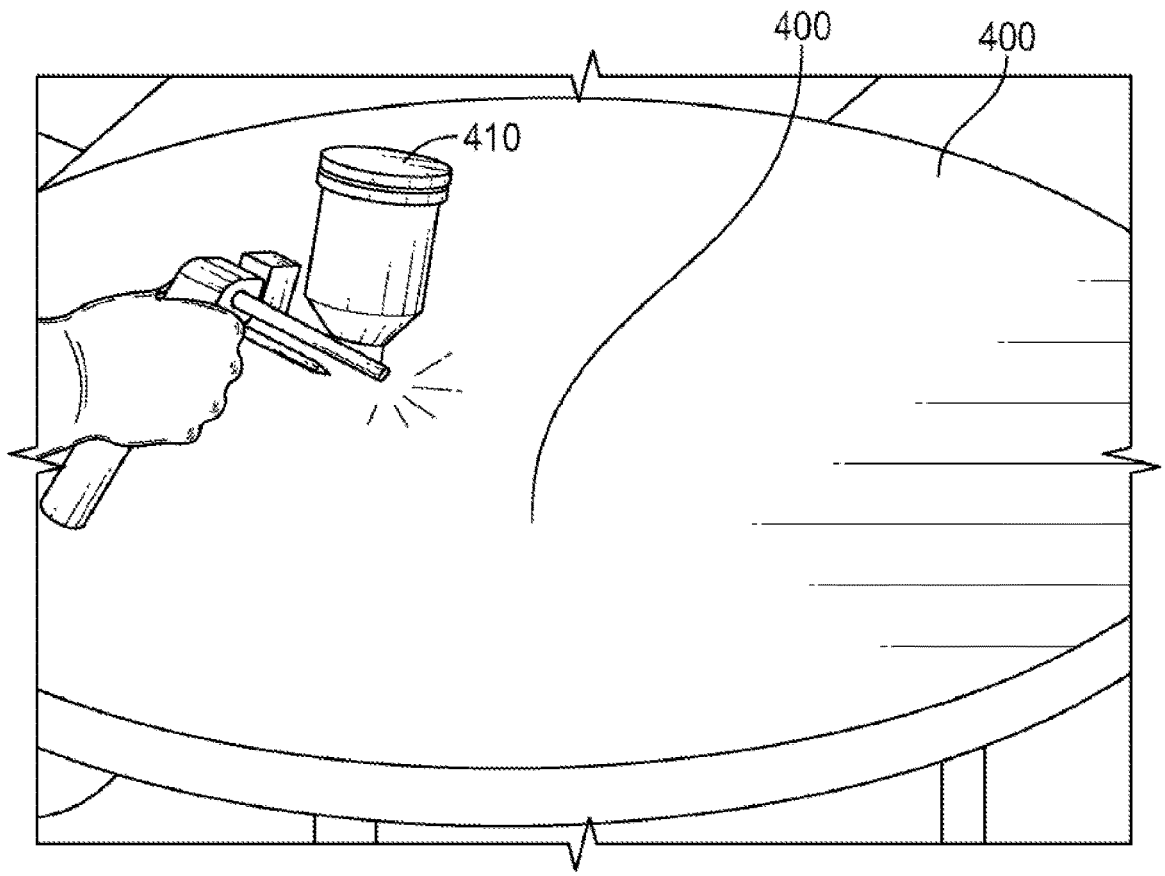
FIG. 10 is a perspective top side view of the workpiece of FIG. 1 during spraying of a substrate paint onto the workpiece.

Turning now to FIGS. 10-14, after depositing the UV curable coating 200 according to the preselected design 800 onto the at least one surface 110 of the workpiece 100 (FIG. 9) at least one layer of a substrate sealant 400 (alternatively it may be white coating 111) is deposited onto the at least one surface 110. The substrate sealant 400 may be deposited onto the at least one surface 110 via a spraying gun 410 or other suitable device configured for applying at least one layer of the UV curable coating 200 onto the at least one surface (FIG. 10). In embodiments, the sealing paint thickness may be from about 0.001 inches to about 1 inch. For example, the substrate sealant 400 is a sealing paint 400 which may include about 60% of an acrylic resin, about 7% of a curing agent, and about 33% of a butyl ester (commercially available by Bayer AG).

Furthermore, an additional layer of UV curable coating 500 is applied to the at least one surface 110 via a spraying gun 410' (FIG. 5). The UV curable coating 500 can be similar or substantially similar to the UV curable coating 200. The UV curable paint 300 may be deposited as a coat of a thickness from about 0.001 inches to about 1 inch depending on the application. In embodiments, a square meter area of the at least one surface 110 may include about 75 grams to 150 grams of the UV curable coating 500 or UV curable paint 500. In embodiments, the UV curable paint 500 may be translucent, transparent, or opaque. In one example, the UV curable paint 500 may have the following components by weight (commercially available by Guangdong Shenzhen Industrial Co.):

| Components | Item# | weight |
| --- | --- | --- |
| UV curable resin | EM265 | 62.80% |
| ethyl ester | / | 26.90% |
| photoinitiator | 400# | 1.30% |
| Ultraviolet light absorber | / | 0.90% |
| matte powder | E-1011 | 5.40% |
| flatting agent | BYK-333 | 2.70% |

Figure 12:
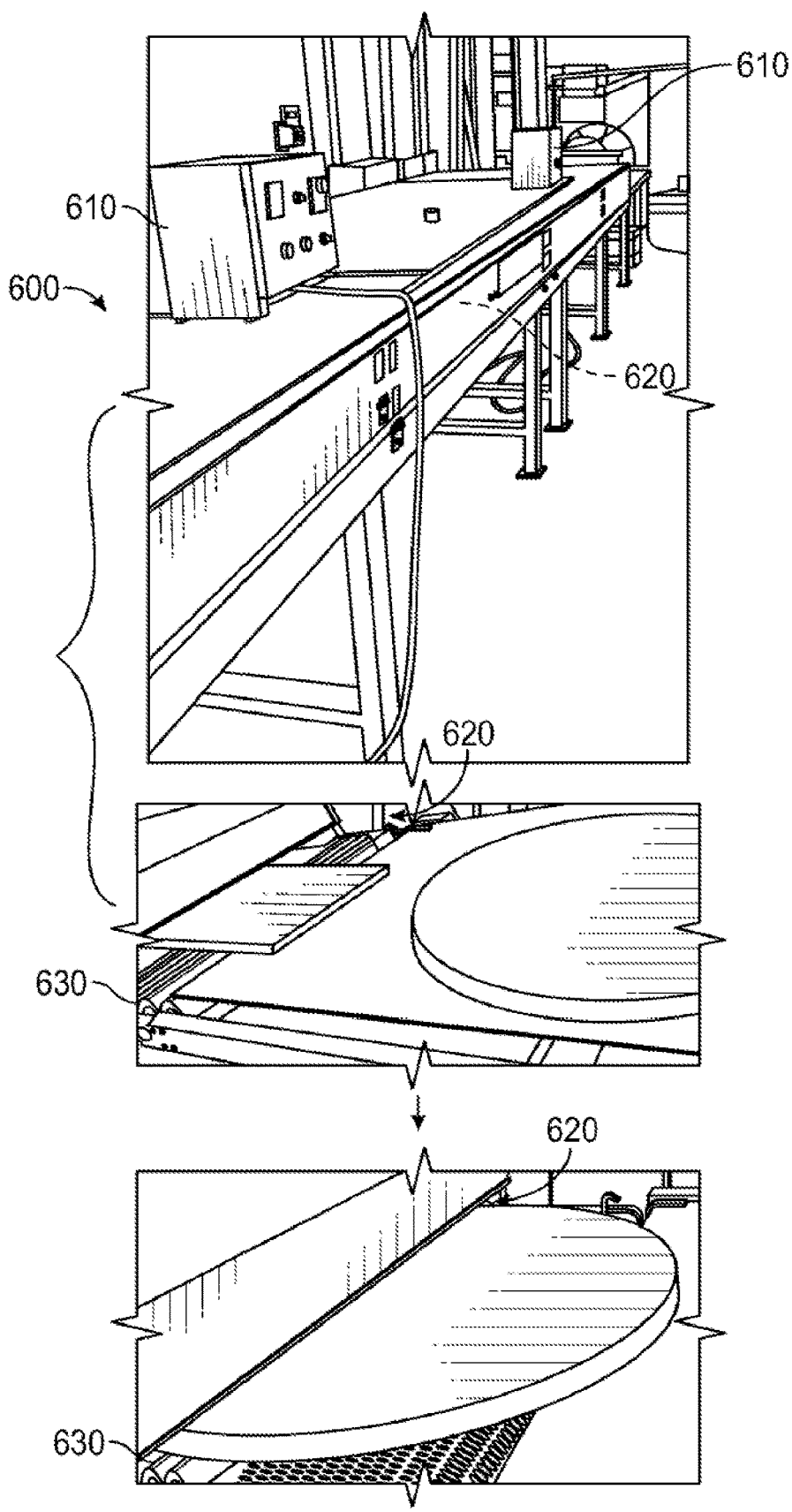
FIG. 12 is a sequence of illustrations showing perspective views during exposure of the workpiece of FIG. 1 to heat, the top and middle figures are corresponding in time.

Finally, the at least one surface 110 of the workpiece 100 is exposed to heat and then to a UV light (or UV radiation), each exposure for a predetermined amount of time at a predetermined temperature. For example, the at least one surface 110 is exposed to the heat emitted by a heating device 600 (FIG. 12). The heating device 600 may be an oven 600 including a heat source 610, a heating chamber 620, and a conveyor belt 630. The heat source 610 is generally disposed above the conveyor belt 630 and the conveyor belt 630 is disposed near the heating chamber 620. The heat source 610 is configured to drive heat into the heating chamber 620. The heating chamber 620 is configured to receive the workpiece 100 (or a plurality of workpieces 100) therethrough. As shown in FIG. 12, the workpiece 100 and a workpiece 100' are disposed onto the conveyor belt 630 while the conveyor belt 630 is transporting the workpiece 100' and the workpiece 100 into the heating chamber 620. The heating device 600 may be set to a temperature between about 50 to about 100 degrees Celcius and may be configured to apply heat onto the workpiece 100 for a time between about 10 to about 30 minutes.

Figure 13:
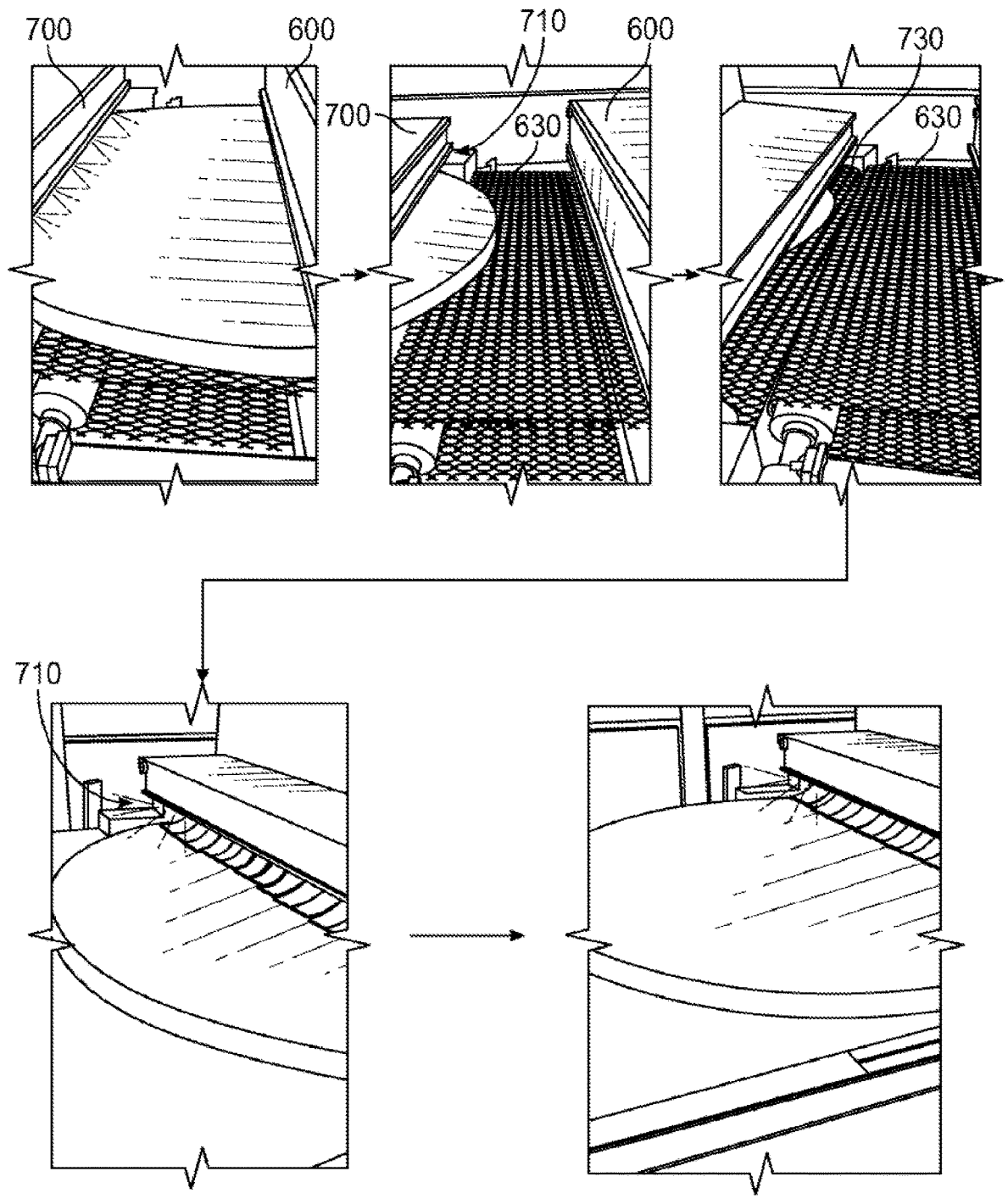
FIG. 13 are perspective views depicting a sequence showing exposure of the workpiece of FIG. 1 to a UV light.
Figure 14:
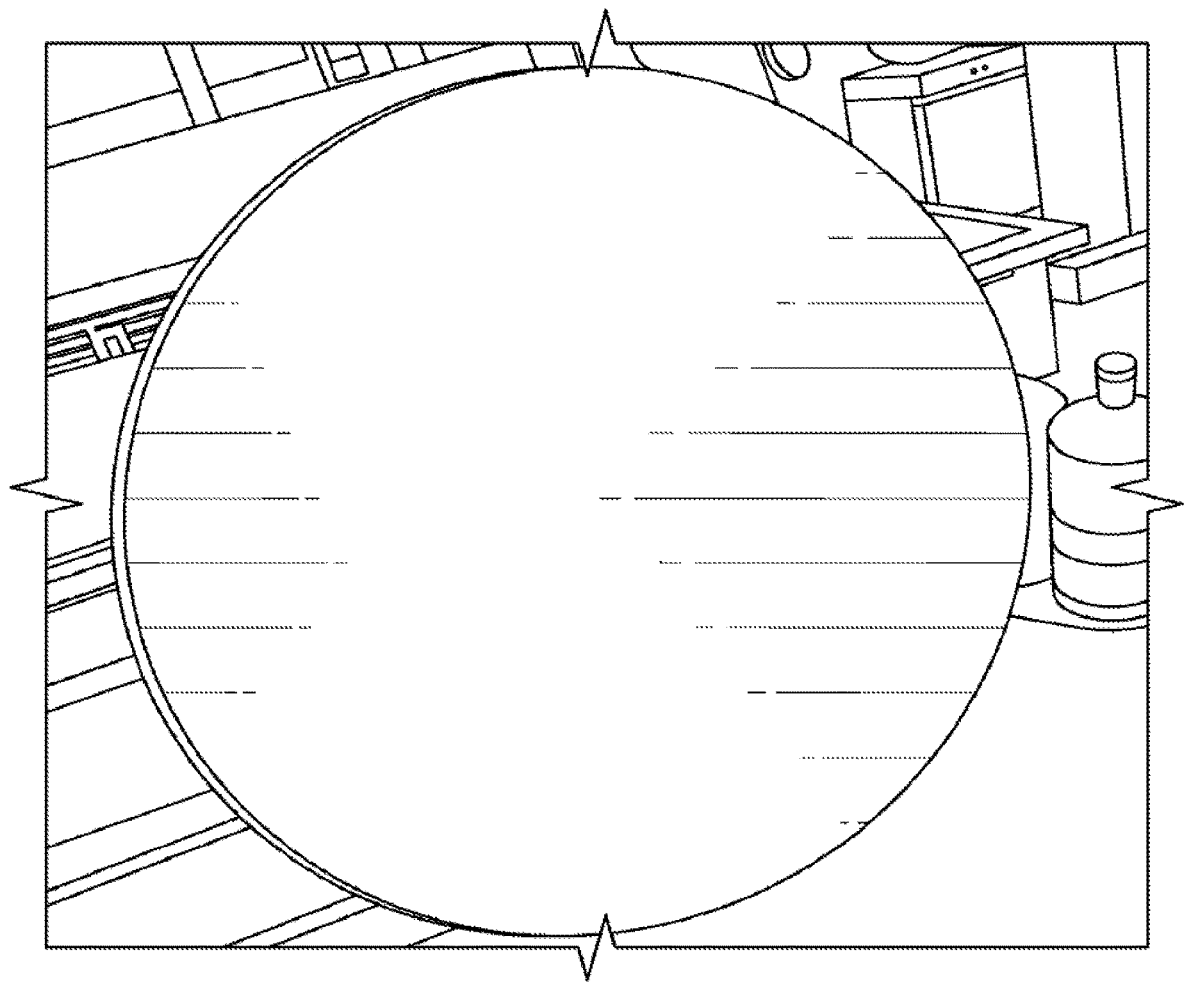
FIG. 14 is a front view of the workpiece of FIG. 1 including the design after the UV exposure.

With reference to FIG. 13, the at least one surface 110 is further exposed to a second UV light irradiated by a UV machine 700. The UV machine 700 includes a UV light source (not shown) or a UV lamp (not shown), a UV irradiation zone 710, and a conveyor 730. The conveyor belt 730 is configured to transport the workpiece into the UV irritation zone 710. The UV irradiation zone 710 is configured to receive the workpiece 100 (or a plurality of workpieces 100) therethrough. As shown in FIG. 12, the workpiece 100 is disposed onto the conveyor belt 730 while the conveyor belt 730 is transporting the workpiece 100 into the UV irradiation zone 710. The UV machine 700 may be set to an intensity of about 500 watts to about 700 watts, in embodiments about 600 watts, UV radiation during a predetermined time period of about 10 to about 30 minutes, in embodiments about 15 to about 25 minutes. For selected embodiments, the UV machine 700 may be included in an assembly line (e.g. assembly line 900—FIG. 17) further disposed adjacent to the heating device 600. Thus, it may be desired to have the conveyor belt 630 aligned or connected with the conveyor belt 730.

Figure 15:
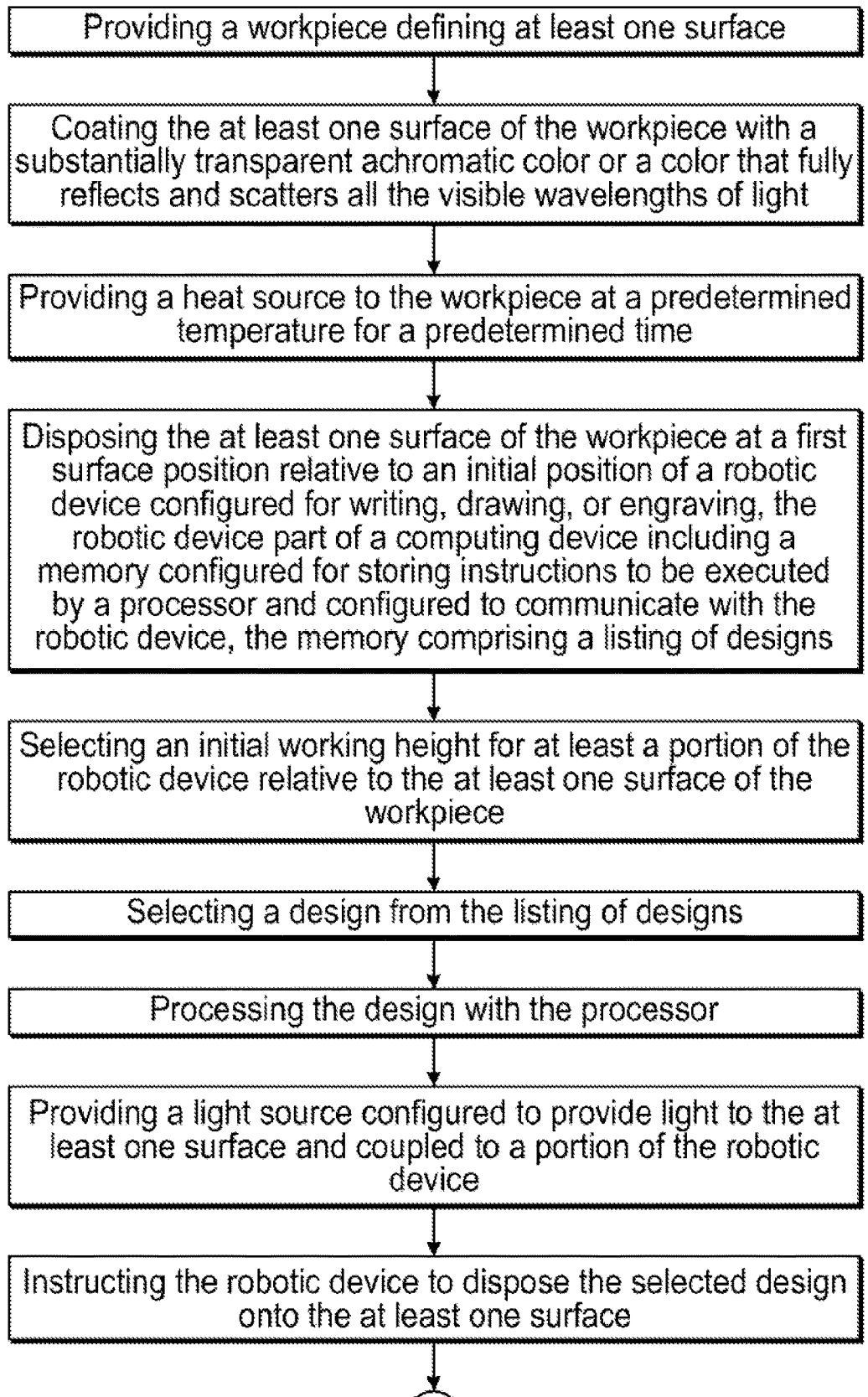
FIGS. 15 and 16 are diagrams showing steps associated with exemplary processes for depositing a design onto the workpiece of FIG. 1.
Figure 15:
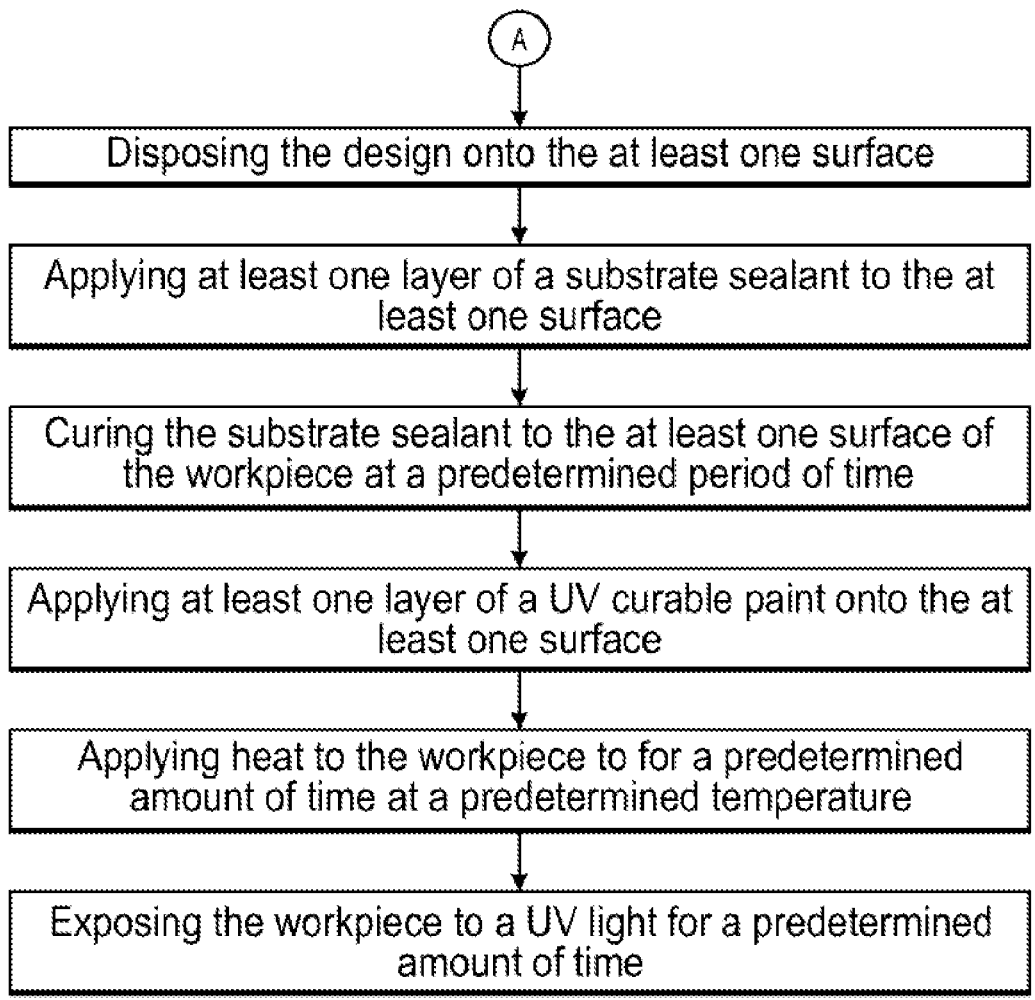
Figure 16:
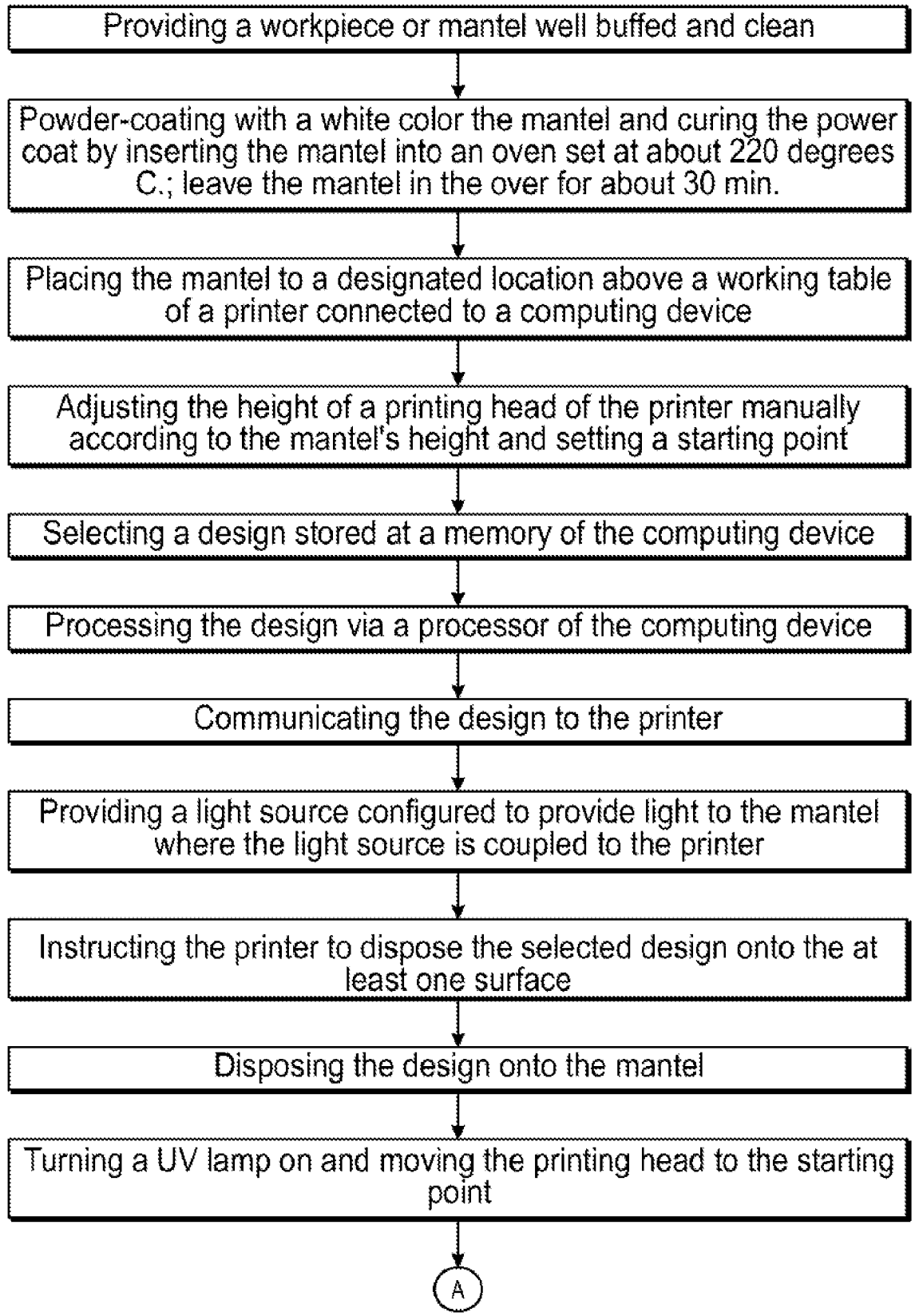
Figure 16:
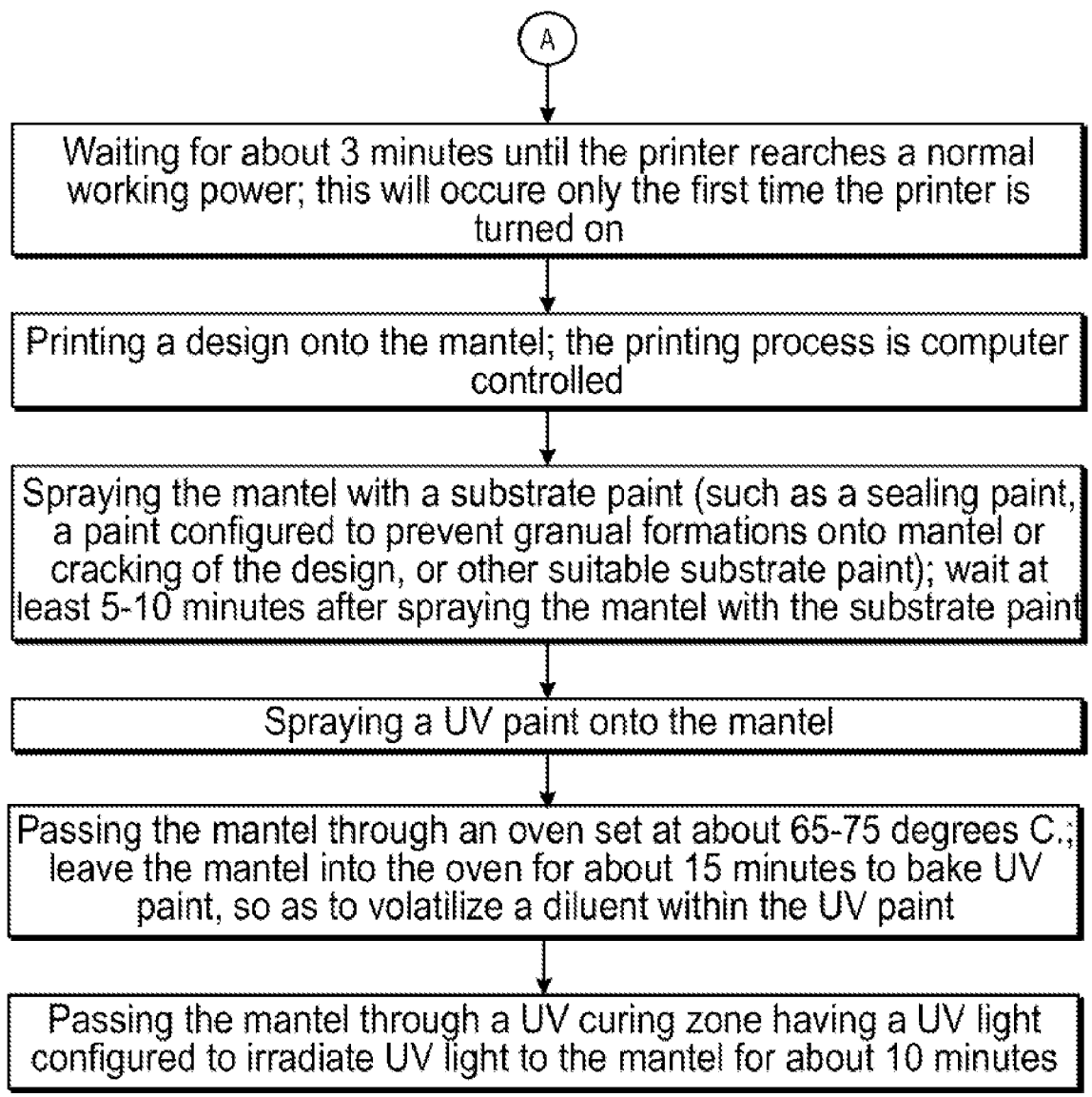
Figure 17:
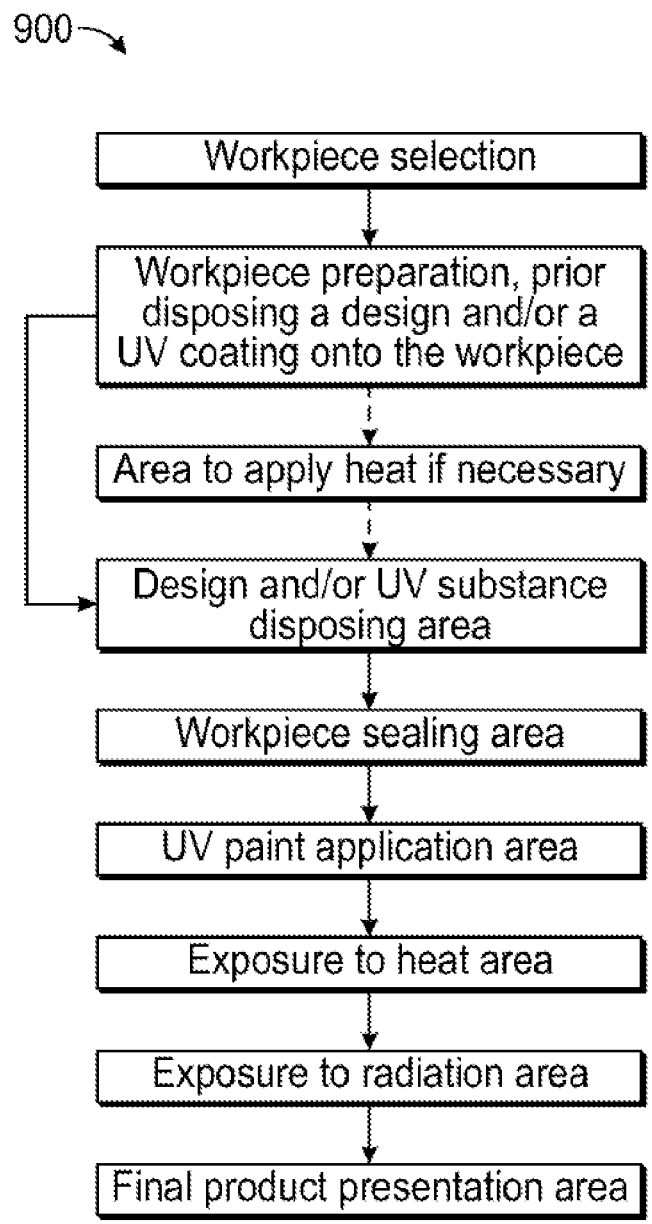
FIG. 17 is a diagram showing a configuration of an assembly line associated with deposition of a design onto the workpiece of FIG. 1.

Turning now to FIGS. 15-17 (in view of FIGS. 1-14), exemplary methods and configurations to carry the methods for depositing a UV curable coating 200 and/or design 800 onto workpiece 100 are provided. As noted above, the workpiece 100 or a portion thereof such as the at least one surface 110 is configured to receive a plurality of coatings according, more specifically, a UV curable coating 200 and the design 800. As shown in FIGS. 1-3, the at least one surface 110 is configured to receive a UV curable coating 200, specifically, the at least one surface 110 may be buffed and coated with a substantially transparent achromatic color coating 111 (shown as a white substance in FIGS. 1-3). The quantity of coating 111 disposed onto the at least one surface 110 may be selected relative to the dimensions of the surface to be treated (e.g about 50 grams to 100 about grams). After configuring the workpiece 100 to receive the UV curable coating 200, the workpiece 100 is disposed onto the working space 321 between the bed 320 and the moving rail 340. Moreover, the robotic device 300 is configured to define a location of the workpiece 100 relative to the working space 321 and further define a starting point or point 321a for the printing head 330 to begin depositing the design 800 onto the at least one surface 110. In FIG. 3, the printing head 330 is configured at a predetermined working height "WH" according to a predetermined distance or thickness "T" of the workpiece 100, the working height "WH" may be the distance between the printing head 330 and at least one surface 110 of the workpiece 100. The printing head 330 of the robotic device 300 is configured to communicate with the computing device 330; the computing device 330 being configured to store the design 800. A user can visualize the design 800 (or a list of designs from which a design 800 can be chosen from) on the display 331 (FIG. 4) and further modify the design 800 if needed. After selecting the design 800, the design 800 is processed at the computing device 330 (FIG. 5). The robotic device 300 is instructed to deposit the design 800 onto the at least one surface 110 of the workpiece 100. In embodiments, the robotic device 300 may only begin depositing the design 800 and begin a photochemical process where a UV light source 330 is used to cure the UV curable coating 200 after the robotic device 300 reaches a normal working power (selected depending on the conditions of the machine, design, material) and/or when the UV lamp is lit for about 2 to about 7 minutes, in embodiments after about 3 minutes (time subject to change according to a particular substrate). For configurations where the robotic device 300 is part of an assembly line, the robotic device 300 may only be required to reach the normal working power prior to depositing the UV curable coating 200 onto a first workpiece 300. Some may describe or encompass the deposition of the design 800 and the UV curable coating 200 in a printing process where the design 800 is printed onto the at least one surface 110 which starts after the printing head 330 moves to a start location as seen in FIG. 6. The printing process can be computer-controlled, as shown in FIG. 8, wherein the printing process may be controlled by the robotic device 300. The robotic device 300 (or computer software 302 stored in the robotic device 300) may include an indicator 301 configured to aid visualization of the printing process. The indicator 301 may be associated with the movement of the printing head 330. In selected embodiments, the computer software 302 may be any printing software known in the art (such as PrintExp.exe and/or UltraPrint.exe).

Figure 11:
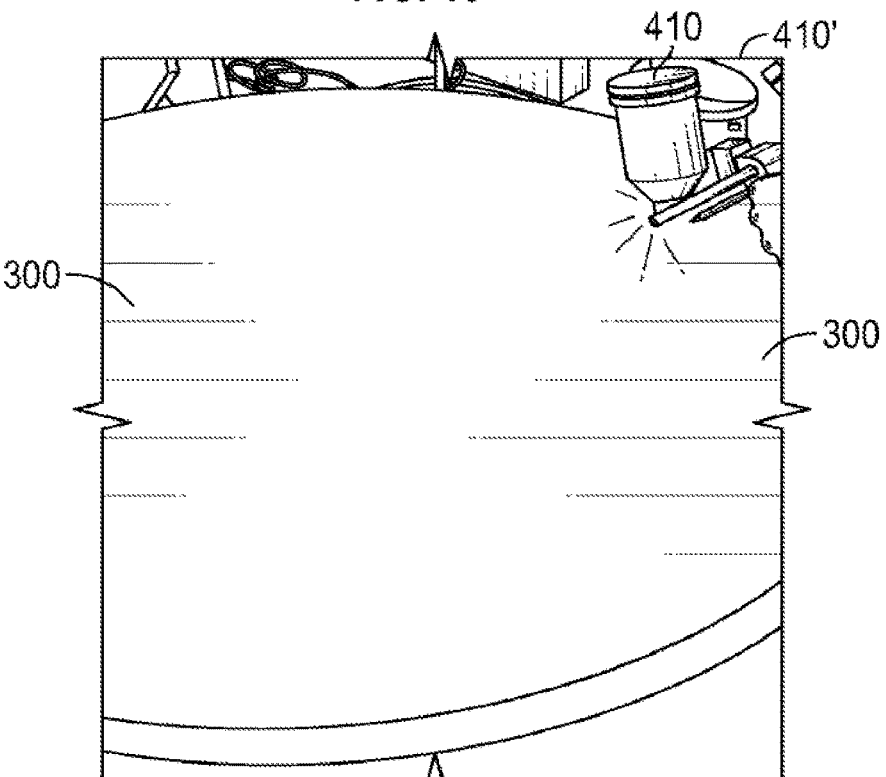
FIG. 11 is a perspective right side view of the workpiece of FIG. 1 during spraying of a UV paint onto the workpiece.

After deposition of the design 800 and/or the UV coating coating 200 onto the at least one surface 110, the at least one surface 110 or a portion thereof may be covered with at least one layer of the coating sealant 400 (FIG. 10) discussed hereinabove, followed by application of at least one layer of the UV curable coating 500 (FIG. 11). Additional layers of the coating sealant 400 or the UV curable paint 500 may be applied to the at least one surface 110 until reaching a desired appearance or texture.

After a desired amount or layers of UV curable coating 500 is sprayed onto the at least one surface 110, the at least one surface 110 is exposed to heat emitted via a heating device such as the heating device 600. At the heating device 600, the workpiece 110 is disposed onto the conveyor belt 630 and passed through the heating device heating chamber 620 which is configured to bake or cure the UV curable paint 500 (and/or coatings deposited below said layer), so as to volatilize any diluents.

Additionally, after the workpiece 100 leaves the heating device 600, the workpiece 100 is exposed to UV light via the UV machine 700. At the UV machine 700 the workpiece 100 passes through the UV irradiation zone 710 or UV curing zone 710. The UV machine 700 may include a UV lamp (not shown) having a working power of about 600 watts. In embodiments, the UV machine 700 may be configured to emit a blinking UV light which may slowdown the curing reaction of the coatings deposited onto the working piece 100. Ultimately the workpiece 100 is removed from the UV machine 700 with the design 800 shown thereon.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

The invention claimed is:

1. A method for printing or depositing a faux design on a workpiece including:
coating at least one surface of the workpiece with an optically transparent achromatic color coating or with a color coating that fully reflects and scatters visible wavelengths of light;
exposing the workpiece to a heat source at a first predetermined temperature for a first predetermined time;
selecting a design from a listing of predetermined designs configured according to the workpiece;
depositing at least one UV curable coating according to the design onto the at least one surface while exposing the design to a UV light for a predetermined time;
applying at least one layer of a substrate sealant to the at least one surface and the at least one UV curable coating;
applying heat to the at least one surface, which has been applied with the at least one layer of the substrate sealant, for a second predetermined time at a second predetermined temperature; and
exposing the workpiece to a UV radiation emitted from a UV source for a third predetermined time at a third predetermined temperature, such that the design is permanently affixed to the workpiece to provide the faux design.

2. The method according to claim 1, wherein the workpiece is selected from a mantel, table top, or tile piece, and the at least one surface is a surface buffed and cleaned of debris prior to coating the at least one surface of the workpiece with a substantially transparent achromatic color.

3. The method according to claim 1, wherein the coating the at least one surface of the workpiece with an optically transparent achromatic color includes a powder coating process.

4. The method according to claim 1, wherein the heat source is selected from an oven, a lamp, a light, and a hand held heating device.

5. The method according to claim 1, wherein during exposing the workpiece to the heat source at the first predetermined temperature for the first predetermined time, the first predetermined temperature is selected from a range between approximately 200 to approximately 250 degrees Celsius and the first predetermined time is selected from between approximately 20 to approximately 50 minutes.

6. The method according to claim 1, wherein the depositing is performed by a robotic device and includes:
selecting an operable height for the robotic device or a portion thereof relative to the at least one surface;
defining a first surface position for the workpiece or the at least one surface; and
defining a coordinate system relative to a portion of the robotic device.

7. The method according to claim 6, wherein a portion of the robotic device is a movable printing head of a CNC printer and a light source is a UV light source configured to provide UV light to the at least one surface.

8. The method according to claim 7, wherein the UV light source is configured to provide the UV light automatically after processing the design or automatically after the movable printing head starts depositing the design onto the at least one surface.

9. The method according to claim 6, further comprising configuring the robotic device in such a way that a light source and a portion of the robotic device are moveable relative to an initial position of the at least one surface and an initial position of the robotic device.

10. The method according to claim 9, wherein the light source and the portion of the robotic device are disposed above the at least one surface defining a printing plane.

11. The method according to claim 10, wherein the light source and the portion of the robotic device are configured to move along the printing plane or to move at a set height relative to the at least one surface in a horizontal direction.

12. The method according to claim 6, wherein the robotic device is configured to be instructed to carry out sequences of arithmetic or logical operations robotically via computer programming.

13. The method according to claim 6, wherein the robotic device is configured to include a visual indicator configured to show how much of the design is deposited during deposition of the design onto the workpiece.

14. The method according to claim 6, wherein configuring the robotic device according to the workpiece includes selecting an initial working height for at least a portion of the robotic device relative to the at least one surface of the workpiece.

15. The method according to claim 6, wherein the coordinate system is configured to use one or more numbers, or coordinates, to uniquely determine a first selected surface position of the workpiece or geometric features thereof after the workpiece.

16. The method according to claim 1, wherein depositing the selected design onto the at least one surface is carried by a printer head of a robotic device which is disposed at an initial working height, the initial working height being defined as a distance measured from a working table onto which the workpiece is disposed.

17. The method according to claim 1, wherein the predetermined listing of designs includes patterns selected from wood like patterns, concrete like patterns, linear patterns, animal patterns, geometric patterns, abstract shaped patterns, and camouflage patterns with or without at least one color.

18. The method according to claim 17, further comprising applying a second layer selected from paint, a UV curable coating, and mixtures thereof to create textures before or after the deposition of the design on the at least one surface.

19. The method according to claim 1, further comprising selecting a color or plurality of colors from a listing of colors to be deposited onto the at least one surface of the workpiece.

20. The method according to claim 1, further comprising:
assessing whether the design selected from the predetermined listing of designs needs adjustments; and
adjusting the design or a feature of the design if adjustments are needed.

21. The method according to claim 1, wherein the second predetermined time for curing the at least one layer of the substrate sealant is selected from a range between about 5 minutes to about 10 minutes.

22. The method according to claim 1, wherein the at least one layer of the substrate sealant is a liquid sealant comprising about 60% of an acrylic resin, about 7% of a curing agent, and about 33% of a butyl ester.

23. The method according to claim 1, wherein applying heat to the workpiece for the second predetermined time at the second predetermined temperature further includes applying the heat via an oven including a heat source, a heat chamber and a conveyor belt and the second predetermined time is from about 10 to about 20 minutes and the second predetermined temperature is from about 50 to about 100 degrees Celsius.

24. The method according to claim 1, wherein exposing the workpiece to UV irradiation light for the third predetermined time at the third predetermined temperature further includes applying the UV light via a UV machine including a UV light source configured to apply the UV light to the at least one surface, a UV radiation chamber or UV irradiation zone configured to receive the workpiece there through, and a conveyor belt configured to transport the workpiece along the UV radiation chamber and the third predetermined time is from about 10 to about 20 minutes.

25. The method according to claim 24, wherein the conveyor belt of the UV machine is configured to receive the workpiece after being transported by the conveyor belt after applying heat to the workpiece.

26. The method according to claim 1, further comprising disposing a UV curable coating according to the design onto the at least one surface while exposing the UV curable coating to the UV light emitted by a UV light source coupled to a printing head of a robotic device.

27. The substrate comprising a printed, faux pattern formed by the method of claim 1.

* * * * *